(12) United States Patent
Naruse

(10) Patent No.: US 9,604,420 B2
(45) Date of Patent: Mar. 28, 2017

(54) TIRE PUNCTURE SEALANT

(71) Applicant: THE YOKOHAMA RUBBER CO., LTD., Minato-Ku, Tokyo (JP)

(72) Inventor: Masahiro Naruse, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/910,802

(22) PCT Filed: Aug. 7, 2014

(86) PCT No.: PCT/JP2014/070940
§ 371 (c)(1),
(2) Date: Feb. 8, 2016

(87) PCT Pub. No.: WO2015/020171
PCT Pub. Date: Feb. 12, 2015

(65) Prior Publication Data
US 2016/0185053 A1    Jun. 30, 2016

(30) Foreign Application Priority Data
Aug. 9, 2013   (JP) ................................. 2013-166217

(51) Int. Cl.
*B29C 73/16*    (2006.01)
*C09J 107/02*   (2006.01)
*C09J 131/02*   (2006.01)
*C09J 131/04*   (2006.01)

(52) U.S. Cl.
CPC ........... *B29C 73/163* (2013.01); *C09J 107/02* (2013.01); *C09J 131/02* (2013.01); *C09J 131/04* (2013.01)

(58) Field of Classification Search
CPC ..... B29C 73/163; C09J 107/02; C09J 131/02; C09J 131/04
USPC ....................................................... 523/166
See application file for complete search history.

(56) References Cited

U.S. PATENT DOCUMENTS

2014/0221527 A1* 8/2014 Naruse ................. B29C 73/163
523/166

FOREIGN PATENT DOCUMENTS

JP          5168394 B2    3/2013

* cited by examiner

*Primary Examiner* — Edward Cain
(74) *Attorney, Agent, or Firm* — Carrier Blackman & Associates, P.C.; Joseph P. Carrier; Fulchand P. Shende

(57) ABSTRACT

An object of the present invention is to provide a tire puncture sealant having excellent sealing performance and low-temperature properties. The tire puncture sealant of the present invention contains a natural rubber latex (A) and a vinyl versatate copolymer resin emulsion (B) as an emulsion of a vinyl versatate copolymer resin (b1) containing vinyl versatate as a monomer unit; the proportion of the vinyl versatate with respect to all monomer units constituting the vinyl versatate copolymer resin (b1) being from 30 to 70 mass %.

16 Claims, No Drawings

TIRE PUNCTURE SEALANT

TECHNICAL FIELD

The present invention relates to a tire puncture sealant.

BACKGROUND ART

Patent literature 1 describes a "tire puncture sealant containing a natural rubber latex, a synthetic resin emulsion, and propylene glycol", wherein the synthetic resin contained in the synthetic resin emulsion is an "ethylene-vinyl acetate-vinyl versatate copolymer resin" ([Claim 1] and [Claim 3]).

In addition, it is described in [0014] of Patent literature 1 that the monomer ratio (ethylene:vinyl acetate:vinyl versatate) constituting the "ethylene-vinyl acetate-vinyl versatate copolymer resin" described above is preferably from 5:5:90 to 10:5:85 in terms of the mass ratio", and in the [Working Examples], "Sumikaflex 950HQ, manufactured by Sumika Chemtex Co., Ltd.; ethylene:vinyl acetate:vinyl versatate=10:5:85; solid content=53 mass %" is used ([0031]).

CITATION LIST

Patent Literature

Patent Literature 1: Japanese Patent No. 5168394B

SUMMARY OF INVENTION

Technical Problem

In recent years, the level of performance required of tire puncture sealants has increased. In particular, there is a demand to improve the sealing performance, injectability, or the like in low-temperature environments (low-temperature properties) while maintaining the storage performance serving as the basic performance of the tire puncture sealant.

As a result of investigating the tire puncture sealant described in Patent literature 1, the present inventors revealed that there is room for improvement with regard to low-temperature properties.

The present invention was conceived in light of the issues described above, and an object of the present invention is to provide a tire puncture sealant having excellent storage performance and low-temperature properties.

Solution to Problem

As a result of conducting dedicated research in order to achieve the object described above, the present inventors discovered that the low-temperature properties can be improved while maintaining the storage performance by using a specific ratio of the vinyl versatate in the vinyl versatate copolymer resin contained in the tire puncture sealant, and the present inventors thereby completed the present invention.

Specifically, the present invention provides the following (1) to (5).

(1) A tire puncture sealant containing a natural rubber latex (A) and a vinyl versatate copolymer resin emulsion (B) as an emulsion of a vinyl versatate copolymer resin (b1) containing vinyl versatate as a monomer unit; a proportion of the vinyl versatate with respect to all monomer units constituting the vinyl versatate copolymer resin (b1) being from 30 to 70 mass %.

(2) The tire puncture sealant according to claim 1, the vinyl versatate copolymer resin emulsion (B) containing an emulsifier (b2) containing polyvinyl alcohol; and a content of the emulsifier (b2) being from 0.8 to 3.0 mass % with respect to a solid content of the vinyl versatate copolymer resin emulsion (B).

(3) The tire puncture sealant according to (1) or (2), the vinyl versatate copolymer resin (b1) being an ethylene-vinyl acetate-vinyl versatate copolymer resin.

(4) The tire puncture sealant according to any one of (1) to (3) further containing a propylene glycol (C); a mass ratio (B/C) of a solid content of the vinyl versatate copolymer resin emulsion (B) to the propylene glycol (C) being from 0.1 to 1.1.

(5) The tire puncture sealant according to any one of (1) to (4), a mass ratio (A/B) of a solid content of the natural rubber latex (A) to a solid content of the vinyl versatate copolymer resin emulsion (B) being from 90/10 to 40/60.

Advantageous Effects of Invention

With the present invention, it is possible to provide a tire puncture sealant having excellent storage performance and low-temperature properties.

DESCRIPTION OF EMBODIMENTS

[Tire Puncture Sealant]

The tire puncture sealant of the present invention is a tire puncture sealant containing a natural rubber latex (A) and a vinyl versatate copolymer resin emulsion (B) as an emulsion of a vinyl versatate copolymer resin (b1) containing vinyl versatate as a monomer unit; the proportion of the vinyl versatate with respect to all monomer units constituting the vinyl versatate copolymer resin (b1) being from 30 to 70 mass %.

When the proportion of vinyl versatate with respect to all monomer units constituting the vinyl versatate copolymer resin (b1) (also called the "amount of vinyl versatate" for the sake of convenience hereafter) exceeds 70 mass %, the low-temperature properties of the low-temperature sealing performance or low-temperature injectability are insufficient, but when the proportion is 70 mass % or lower, these low-temperature properties become satisfactory.

Although the reason for this is not clear, it is assumed to be as follows. Specifically, since vinyl versatate has a relatively large molecular weight as a monomer unit, the viscosity of the entire copolymer resin tends to become high when the amount of vinyl versatate is large, so suppressing the amount of vinyl versatate is thought to yield a moderate viscosity and to improve the sealing performance or injectability in low-temperature environments. However, even if the mechanism is a mechanism other than that described above, the mechanism falls within the scope of the present invention.

Further, even if the amount of vinyl versatate is less than 30 mass %, the low-temperature properties are relatively favorable, but the storage performance serving as the basic performance of the tire puncture sealant is poor, so the amount is set to at least 30 mass %.

Each constituent contained in the tire puncture sealant of the present invention will be described in detail hereinafter.

[Natural Rubber Latex (A)]

The natural rubber latex (A) is not particularly limited, and a conventionally known latex may be used. For example, a deproteinized natural rubber latex prepared by removing proteins from a natural rubber latex may be suitably used. If a protein content of the natural rubber latex (A) is low, it is possible to reduce the amount of ammonia produced, which is desirable from the perspectives of preventing corrosion damage of steel cords by ammonia and preventing the generation of irritating odors. Specific examples of natural rubber latex include Deproteinized Natural Rubber Latex (SeLatex series, manufactured by SRI Hybrid Ltd.), Deproteinized Natural Rubber Latex (HA, manufactured by Nomura Trading Co., Ltd.), and Ultra-low Ammonia Natural Rubber Latex (ULACOL, manufactured by Regitex Co., Ltd.).

One type of the natural rubber latex (A) may be used alone, or two or more types may be used in combination.

The weight average molecular weight (Mw) of the natural rubber contained in the natural rubber latex (A) is not particularly limited.

Note that the weight average molecular weight (Mw) is the weight average molecular weight expressed in terms of polystyrene, which is determined by gel permeation chromatography (GPC) using tetrahydrofuran as a solvent (same hereafter).

In addition, the tire puncture sealant of the present invention may further contain a synthetic rubber latex in addition to the natural rubber latex (A), examples of which include SBR latex, NBR latex, carboxy-modified NBR latex, and carboxy-modified SBR latex.

[Vinyl Versatate Copolymer Resin Emulsion (B)]

The vinyl versatate copolymer resin emulsion (B) is an emulsion in which a vinyl versatate copolymer resin (b1) is dispersed as a dispersoid in a dispersion medium such as water.

At this time, the phase of the vinyl versatate copolymer resin (b1) serving as a dispersoid may be a liquid phase or a solid phase.

In general, a system in which a liquid phase dispersoid is dispersed in a liquid phase dispersion medium is called an "emulsion", and a system in which a solid phase dispersoid is dispersed in a liquid phase dispersion medium is called a "suspension"; however, in the present invention, the term "emulsion" includes "suspension".

<Vinyl Versatate Copolymer Resin (b1)>

The vinyl versatate copolymer resin (b1) described above is a copolymer resin containing vinyl versatate, which is an ester of versatic acid and vinyl alcohol, as a monomer unit—that is, a copolymer resin comprising monomer units including vinyl versatate.

Examples of monomer units other than vinyl versatate include ethylene, vinyl acetate, and (meth)acrylesters.

The vinyl versatate copolymer resin (b1) may be, for example, a random copolymer, a block copolymer, or a graft polymer.

Specific examples of such a vinyl versatate copolymer resin (b1) include ethylene-vinyl acetate-vinyl versatate copolymer resins, vinyl acetate-vinyl versatate copolymer resins, vinyl acetate-vinyl versatate-(meth)acrylic acid ester copolymer resins, and vinyl acetate-vinyl versatate-(meth)acrylic acid ester-ethylene copolymer resins. One type of these may be used alone, or two or more types may be used in combination.

Of these, ethylene-vinyl acetate-vinyl versatate copolymer resins are preferable in that the low-temperature sealing performance is superior.

Here, the weight average molecular weight (Mw) of the vinyl versatate copolymer resin (b1) is not particularly limited but is preferably from 10,000 to 500,000 and more preferably from 50,000 to 200,000.

In addition, the glass transition point (Tg) of the vinyl versatate copolymer resin (b1) is not particularly limited but is preferably approximately −20° C. or lower, more preferably approximately −25° C. or lower, and even more preferably approximately −30° C. or lower.

Here, the glass transition temperature (Tg) is measured using a thermograph by differential scanning calorimetry (DSC) at a temperature elevation rate of 10° C./minute. The temperature at the midpoint of the transition region is set as the glass transition temperature thereof (same hereafter).

(Amount of Vinyl Versatate)

In the present invention, the proportion of vinyl versatate (amount of vinyl versatate) with respect to all monomer units constituting the vinyl versatate copolymer resin (b1) is from 30 to 70 mass % and preferably from 40 to 60 mass % due to the reasons stated above.

(Monomer Mass Ratio)

When the vinyl versatate copolymer resin (b1) is an ethylene-vinyl acetate-vinyl versatate copolymer resin, the monomer ratio constituting the resin (ethylene:vinyl acetate:vinyl versatate) is preferably 10-40:10-40:30-70 and more preferably 15-35:15-35:40-60 in terms of the mass ratio (this is also called the "monomer mass ratio" hereafter).

<Emulsifier (b2)>

The vinyl versatate copolymer resin emulsion (B) described above preferably contains an emulsifier (b2) containing polyvinyl alcohol. That is, the vinyl versatate copolymer resin (b1) serving as a dispersoid is preferably dispersed in the dispersion medium due to the action of the emulsifier (b2).

The emulsifier (b2) may contain polyvinyl alcohol alone or may contain emulsifier components other than polyvinyl alcohol. Examples of emulsifier components other than polyvinyl alcohol include protective colloids such as hydroxyethyl cellulose, methyl cellulose, and carboxymethyl cellulose; nonionic surfactants such as polyoxyethylene alkyl ether, polyoxyethylene alkyl phenol ether, polyoxyethylene-polyoxypropylene block polymers, polyoxyethylene fatty acid esters, and polyoxyethylene sorbitan fatty acid esters; and anionic surfactants such as alkyl sulfuric acid ester salts, alkyl benzenesulfonic acid salts, alkyl sulfosuccinic acid salts, alkyl diphenyl ether disulfonic acid salts, polyoxyethylene alkyl sulfuric acid salts, and polyoxyethylene alkyl phosphoric acid salts. One type of these may be used alone, or two or more types may be used in combination.

Polyvinyl alcohol (PVA) is also called poval and is typically obtained by saponifying polyvinyl acetate prepared by polymerizing vinyl acetate. A low-saponified PVA or a completely saponified PVA may be used as such polyvinyl alcohol, but a partially saponified PVA having a degree of saponification of from 80 to 90 mol % is preferably used, and the degree of polymerization is preferably from 300 to 1,700. In addition, the polyvinyl alcohol may be modified by a compound such as carboxylic acid, sulfonic acid, or a siloxane.

One type of polyvinyl alcohol may be used alone, or two or more types may be used in combination.

(Emulsifier Amount)

In the vinyl versatate copolymer resin emulsion (B) described above, the content of the emulsifier (b2) (also called the "emulsifier amount" hereafter) with respect to the solid content of the vinyl versatate copolymer resin emulsion (B) is preferably from 0.8 to 3.0 mass % and more preferably from 1.2 to 2.0 mass %.

When the emulsifier amount is within the range described above, it is possible to achieve high levels of both the storage performance and low-temperature properties of the tire puncture sealant of the present invention.

In particular, there is a possibility that the tire puncture sealant may increase in viscosity when the amount of polyvinyl alcohol is too large, but as long as the emulsifier amount is within the range described above, increases in viscosity are suppressed, and the low-temperature injectability can be further enhanced.

<Production Method for Vinyl Versatate Copolymer Resin Emulsion (B)>

The method for producing the vinyl versatate copolymer resin emulsion (B) as an emulsion of the vinyl versatate copolymer resin (b1) is not particularly limited, and an example is a method of producing (polymerizing) the emulsion with a conventionally known emulsion polymerization method using monomers including vinyl versatate and the emulsifier (b2) described above.

The polymerization conditions are also not particularly limited, but the polymerization temperature is typically from 20 to 80° C. Examples of catalysts include persulfates such as potassium persulfate, hydrogen peroxide, and various organic peroxides. In the case of a red socks initialization system, formaldehyde sodium sulfoxylate or the like is used in combination as a reducing agent.

When producing the vinyl versatate copolymer resin emulsion (B) described above, additives such as a pH adjuster, a thickener, an antifoaming agent, a dispersant, or a preservative may be further added as necessary.

<Mass Ratio (A/B)>

In the tire puncture sealant of the present invention, the mass ratio (A/B) of the solid content of the natural rubber latex (A) to the solid content of the vinyl versatate copolymer resin emulsion (B) is preferably from 90/10 to 40/60 and more preferably from 50/50 to 70/30.

When the mass ratio (A/B) is within the range described above, it is possible to achieve high levels of both the storage performance and low-temperature sealing performance of the tire puncture sealant of the present invention.

In addition, in the present invention, the solid contents of the natural rubber latex (A) and the vinyl versatate copolymer resin emulsion (B) are respectively the heating residues and are specifically the amounts of residues obtained after heating for one hour at 200° C.

For example, the emulsifier (b2) is contained in the solid content of the vinyl versatate copolymer resin emulsion (B).

[Propylene Glycol (C)]

The tire puncture sealant of the present invention preferably further contains propylene glycol (C) as an antifreezing agent.

At this time, the mass ratio (B/C) of the solid content of the vinyl versatate copolymer resin emulsion (B) and the propylene glycol (C) is preferably from 0.1 to 1.1 and more preferably from 0.3 to 0.5.

When the mass ratio (B/C) is within the range described above, it is possible to achieve high levels of both the storage performance and low-temperature sealing performance of the tire puncture sealant of the present invention.

The tire puncture sealant of the present invention may contain water as a solvent, but the mass ratio (C/water) of the propylene glycol (C) and water is preferably from 0.9 to 1.8 and more preferably from 1.0 to 1.2 in that the low-temperature properties of the tire puncture sealant of the present invention are more favorable.

[Other Additives]

The tire puncture sealant of the present invention may further contain additives that may be added as desired other than the respective components described above as necessary. Examples of the additives include antifreeze agents other than propylene glycol (C) (for example, ethylene glycol, diethylene glycol, glycerin, and the like), tackifiers, fillers, antiaging agents, antioxidants, pigments (dyes), plasticizers, thixotropic agents, UV absorbents, flame retardants, surfactants (including leveling agents), dispersants, dehydrating agents, and antistatic agents. The amounts of the additives are not particularly limited.

[Production Method of the Tire Puncture Sealant]

The method for producing the tire puncture sealant of the present invention is not particularly limited, but an example is a method of producing the tire puncture sealant by sufficiently mixing the essential components and optional components described above using a stirring device such as a mixer under reduced pressure.

[Method of Using the Tire Puncture Sealant]

Next, a method of using the tire puncture sealant of the present invention will be described. However, the present invention is not limited to the following method.

First, the tire puncture sealant of the present invention is injected into a tire via an air-filling part of the tire. The method for injecting the tire puncture sealant of the present invention into the tire is not particularly limited, and it is possible to use a conventionally known method such as a method involving use of a syringe or a spray, for example. The amount of the tire puncture sealant injected into the tire is not particularly limited and is selected as appropriate depending on, for example, the size of the puncture hole.

Next, the tire is filled with air until a predetermined air pressure is reached.

The vehicle is then driven. Aggregates of particles or the like of the natural rubber of the natural rubber latex (A) or the vinyl versatate copolymer resin (b1) are formed by the compressive force or shear force exerted when the tire rotates and comes into contact with the ground, thereby enabling the sealing of the puncture hole.

EXAMPLES

The present invention will now be described in greater detail using the following working examples. The present invention is not limited to such working examples.

<Production of Vinyl Versatate Copolymer Resin Emulsion>

A plurality of types of ethylene-vinyl acetate-vinyl versatate copolymer resin emulsions (simply called "vinyl versatate copolymer resin emulsions" hereafter) with different "monomer mass ratios" and "emulsifier amounts" were obtained by appropriately changing the amounts of charged components.

Specifically, a solution prepared by dissolving water, vinyl acetate, vinyl versatate, polyvinyl alcohol (poval 205, produced by Kuraray Co., Ltd., degree of saponification: 88 mol %, average degree of polymerization: 500), a nonionic surfactant (polyoxyethylene alkyl ether, Emulgen 1108, produced by the Kao Corporation), and ferrous sulfate heptahydrate was added to a pressure-resistant container.

Next, the content of the pressure-resistant container was replaced with nitrogen gas, and after the temperature inside the container was increased to 45° C., the container was pressurized to 6.0 MPa with ethylene. A 5% sodium persulfate aqueous solution was added, and a 7% sodium erythorbate aqueous solution was added so as to start polymerization.

Next, after it was confirmed that the liquid temperature inside the pressure-resistant container increased, the oxidizing agents were replaced with 10% sodium persulfate and a 2% tert-butyl hydroperoxide aqueous solution at the point when four hours had passed after polymerization was started while maintaining the liquid temperature inside the container at 50° C. This was added to the pressure-resistant container, and after the pressure-resistant container was cooled so as to remove any unreacted ethylene gas at the point when the residual vinyl acetate monomers fell below 1%, the product was extracted. In this way, a vinyl versatate copolymer resin emulsion was obtained. The solid content was 53 mass %, and the glass transition temperature was −30° C.

<Tire Puncture Sealant Production>

Tire puncture sealants were produced by mixing the components shown in Table 1 below in the amounts (parts by mass) shown in the table.

At this time, a vinyl versatate copolymer resin emulsion produced as described above was obtained as component (B). The "monomer mass ratio" and "emulsifier amount" of the vinyl versatate copolymer resin emulsion that was used in shown in Table 1 below.

In Table 1 below, the lower numerical values (numerical values in parentheses) for components (A) and (B) respectively indicate the compounded amounts in terms of solid content and the total solid content of components (A) and (B) in terms of solid content as a relative value when the total solid content of components (A) and (B) is defined as 100 parts by mass (units: parts by mass).

In addition, water was added as necessary when producing the tire puncture sealants. The amount of water shown in Table 1 below is the total amount of water contained in the total amount of the tire puncture sealant.

<Evaluation>

The following evaluations were performed for the obtained tire puncture sealants. The results are shown in Table 1 below.

(Low-Temperature Sealing Performance)

The sealing performance at −30° C. was evaluated using the obtained puncture sealants.

Specifically, a puncture hole with a size of 4 mm in diameter was first reproduced in the shoulder of the tire. Next, the tire in which the puncture hole was reproduced was mounted on a drum testing machine, and the tire puncture sealant was injected via the valve opening of the tire. The tire was filled with air until the internal tire pressure reached 200 kPa, and a drum test was performed at an ambient temperature of −30° C. In drum tests, one cycle consists of traveling for one minute with a load of 350 kg at a travel speed of 30 km/h.

Under the evaluation criteria for sealing performance, cases in which a seal could be established (air leakage eliminated) in 5 cycles or less were designated as "⊚"; cases in which a seal could be established in from 6 to 10 cycles were designated as "○"; cases in which a seal could be established in 11 or more cycles were designated as "Δ"; and cases in which a seal could not be established were designated as "X". A tire puncture sealant with a result of "⊚" or "○" can be evaluated as having excellent low-temperature sealing performance as a low-temperature property.

(Low-Temperature Injectability)

The viscosity of the obtained tire puncture sealant was measured under conditions at −40° C. and at a revolution speed of 60 rpm using a BL-type viscometer (rotor No. 4).

Cases in which the viscosity of the tire puncture sealant at −40° C. was at least 2000 mPa's and less than 2500 mPa's were designated as "⊚"; cases in which the viscosity was at least 2500 mPa's and less than 3000 mPa's were designated as "○"; and cases in which the viscosity was at least 3000 mPa's were designated as "X". A tire puncture sealant with a result of "⊚" or "○" can be evaluated as having excellent low-temperature injectability as a low-temperature property.

(Storage Performance)

In an atmosphere at 80° C., tests were performed by subjecting the tire puncture sealants to vibration at 20 Hz with an amplitude of ±3 mm for 168 hours.

Under the evaluation criteria for storage performance, cases in which the sealant was stable with no cream generation were designated as "⊚"; cases in which cream was generated but the cream disappeared and the sealant became uniform as a result of stirring the tire puncture sealant were designated as "○"; and cases in which aggregates were generated were designated as "X". A tire puncture sealant with a result of "⊚" or "○" can be evaluated as having excellent storage performance.

TABLE 1

Table 1-1

| | | | Comparative Example | Working Example | | | | | | | | | | Comparative Example | |
|---|---|---|---|---|---|---|---|---|---|---|---|---|---|---|---|
| | | | 1 | 1 | 2 | 3 | 4 | 5 | 6 | 7 | 8 | 9 | 10 | 2 | 3 |
| Mixture composition | (A) | Natural rubber latex | 75 (45) | ← | ← | ← | ← | ← | ← | ← | ← | ← | ← | ← | ← |
| | (B) | Vinyl versatate copolymer resin emulsion | 104 (55) | ← | ← | ← | ← | ← | ← | ← | ← | ← | ← | ← | ← |
| | (C) | Propylene glycol | 110 | ← | ← | ← | ← | ← | ← | ← | ← | ← | ← | ← | ← |
| | | Water | 100 | ← | ← | ← | ← | ← | ← | ← | ← | ← | ← | ← | ← |
| | | Mass ratio (B/C) | 0.50 | ← | ← | ← | ← | ← | ← | ← | ← | ← | ← | ← | ← |
| (B) Physical properties | Monomer mass ratio | Ethylene | 30 | 30 | 25 | ← | ← | ← | ← | ← | ← | 15 | 13 | 8 | 8 |
| | | Vinyl acetate | 50 | 40 | 35 | ← | ← | ← | ← | ← | ← | 25 | 17 | 12 | 12 |
| | | Vinyl versatate | 20 | 30 | 40 | ← | ← | ← | ← | ← | ← | 60 | 70 | 80 | ← |
| | Emulsifier amount/mass % | | 1.2 | ← | 0.4 | 0.8 | 1.2 | 1.6 | 2.4 | 3.0 | 4.0 | 1.2 | ← | 0.8 | 1.2 |
| Performance | Low-temperature sealing performance | | ⊚ | ⊚ | ○ | ○ | ⊚ | ⊚ | ○ | ○ | ○ | ○ | ○ | Δ | Δ |
| | Low-temperature injectability | | ○ | ○ | ⊚ | ⊚ | ⊚ | ⊚ | ⊚ | ⊚ | ○ | ⊚ | ○ | ○ | X |
| | Storage performance | | X | ○ | ○ | ⊚ | ○ | ⊚ | ⊚ | ⊚ | ⊚ | ⊚ | ⊚ | ○ | ○ |

TABLE 2

Table 1-2

|  |  |  | Working Example 11 | Comparative Example 4 | Working Example 12 | Comparative Example 5 | Working Example 13 | Working Example 14 | Working Example 15 |
|---|---|---|---|---|---|---|---|---|---|
| Mixture composition | (A) | Natural rubber latex | 50 (40) | 117 (70) | ← | ← | 150 (90) | 117 (70) | ← |
|  | (B) | Vinyl versatate copolymer resin emulsion | 132 (60) | 57 (30) | ← | ← | 19 (10) | 57 (30) | ← |
|  | (C) | Propylene glycol | 140 | 60 | ← | ← | 20 | 38 | 10 |
|  |  | Water | 127 | 55 | ← | ← | 18 | 34 | 9 |
|  |  | Mass ratio (B/C) | 0.50 | ← | ← | ← | ← | 0.80 | 3.00 |
| (B) Physical properties | Monomer mass ratio | Ethylene | 25 | 30 | 25 | 8 | 25 | ← | ← |
|  |  | Vinyl acetate | 35 | 50 | 35 | 12 | 35 | ← | ← |
|  |  | Vinyl versatate | 40 | 20 | 40 | 80 | 40 | ← | ← |
|  | Emulsifier amount/mass % |  | 1.6 | ← | ← | ← | ← | 2.4 | ← |
| Performance | Low-temperature sealing performance |  | ⊚ | ⊚ | ⊚ | Δ | ⊚ | ⊚ | ○ |
|  | Low-temperature injectability |  | ○ | ⊚ | ⊚ | X | ⊚ | ○ | ○ |
|  | Storage performance |  | ⊚ | X | ⊚ | ⊚ | ○ | ⊚ | ⊚ |

The details of each component shown in Table 1 above are as follows.

Natural rubber latex: Hytex HA (manufactured by Nomura Trading Co., Ltd.; solid content=approximately 60 mass %)

Vinyl versatate copolymer resin emulsion: as described above

Propylene glycol: grade 1 reagent, manufactured by Wako Pure Chemical Industries, Ltd.

As is clear from the results shown in Table 1-1 above, the low-temperature properties were insufficient in Comparative Examples 2 and 3 in which the amount of vinyl versatate exceeded 70 mass %. In addition, the storage performance, which is the basic performance of the tire puncture sealant, was poor in Comparative Example 1 in which the amount of vinyl versatate was less than 30 mass %.

In contrast, Working Examples 1 to 10, in which the amount of vinyl versatate was from 30 to 70 mass %, exhibited favorable storage performance as well as excellent low-temperature properties.

In addition, in a comparison of Working Examples 2 to 8, in which the amount of vinyl versatate was 40 mass %, the low-temperature injectability was more favorable in Working Examples 2 to 7 having an emulsifier amount of at most 3.0 mass % than in Working Example 8 having an emulsifier amount exceeding 3.0 mass %.

Further, the same trends were also observed in the results shown in Table 1 (2) above. That is, the low-temperature properties were insufficient in Comparative Example 5, in which the amount of vinyl versatate exceeded 70 mass %, and the storage performance was poor in Comparative Example 4, in which the amount of vinyl versatate was less than 30 mass %. However, Working Examples 11 to 15, in which the amount of vinyl versatate was from 30 to 70 mass %, exhibited favorable storage performance as well as excellent low-temperature properties.

The invention claimed is:

1. A tire puncture sealant containing a natural rubber latex (A) and a vinyl versatate copolymer resin emulsion (B) as an emulsion of a vinyl versatate copolymer resin (b1) containing vinyl versatate as a monomer unit;
a proportion of the vinyl versatate with respect to all monomer units constituting the vinyl versatate copolymer resin (b1) being from 30 to 70 mass %.

2. The tire puncture sealant according to claim 1, wherein the vinyl versatate copolymer resin emulsion (B) described above contains an emulsifier (b2) containing polyvinyl alcohol; and
a content of the emulsifier (b2) is from 0.8 to 3.0 mass % with respect to a solid content of the vinyl versatate copolymer resin emulsion (B).

3. The tire puncture sealant according to claim 1, wherein the vinyl versatate copolymer resin (b1) is an ethylene-vinyl acetate-vinyl versatate copolymer resin.

4. The tire puncture sealant according to claim 1, further containing a propylene glycol (C), wherein
a mass ratio (B/C) of a solid content of the vinyl versatate copolymer resin emulsion (B) to the propylene glycol (C) is from 0.1 to 1.1.

5. The tire puncture sealant according to claim 1, wherein a mass ratio (A/B) of a solid content of the natural rubber latex (A) and a solid content of the vinyl versatate copolymer resin emulsion (B) is from 90/10 to 40/60.

6. The tire puncture sealant according to claim 2, wherein the vinyl versatate copolymer resin (b1) is an ethylene-vinyl acetate-vinyl versatate copolymer resin.

7. The tire puncture sealant according to claim 2, further containing a propylene glycol (C), wherein
a mass ratio (B/C) of a solid content of the vinyl versatate copolymer resin emulsion (B) to the propylene glycol (C) is from 0.1 to 1.1.

8. The tire puncture sealant according to claim 2, wherein a mass ratio (A/B) of a solid content of the natural rubber latex (A) and a solid content of the vinyl versatate copolymer resin emulsion (B) is from 90/10 to 40/60.

9. The tire puncture sealant according to claim 3, further containing a propylene glycol (C), wherein
a mass ratio (B/C) of a solid content of the vinyl versatate copolymer resin emulsion (B) to the propylene glycol (C) is from 0.1 to 1.1.

10. The tire puncture sealant according to claim 3, wherein a mass ratio (A/B) of a solid content of the natural rubber latex (A) and a solid content of the vinyl versatate copolymer resin emulsion (B) is from 90/10 to 40/60.

11. The tire puncture sealant according to claim 4, wherein a mass ratio (A/B) of a solid content of the natural rubber latex (A) and a solid content of the vinyl versatate copolymer resin emulsion (B) is from 90/10 to 40/60.

12. The tire puncture sealant according to claim 6, further containing a propylene glycol (C), wherein
   a mass ratio (B/C) of a solid content of the vinyl versatate copolymer resin emulsion (B) to the propylene glycol (C) is from 0.1 to 1.1.

13. The tire puncture sealant according to claim 6, wherein a mass ratio (A/B) of a solid content of the natural rubber latex (A) and a solid content of the vinyl versatate copolymer resin emulsion (B) is from 90/10 to 40/60.

14. The tire puncture sealant according to claim 7, wherein a mass ratio (A/B) of a solid content of the natural rubber latex (A) and a solid content of the vinyl versatate copolymer resin emulsion (B) is from 90/10 to 40/60.

15. The tire puncture sealant according to claim 9, wherein a mass ratio (A/B) of a solid content of the natural rubber latex (A) and a solid content of the vinyl versatate copolymer resin emulsion (B) is from 90/10 to 40/60.

16. The tire puncture sealant according to claim 12, wherein a mass ratio (A/B) of a solid content of the natural rubber latex (A) and a solid content of the vinyl versatate copolymer resin emulsion (B) is from 90/10 to 40/60.

* * * * *